US010635920B2

(12) United States Patent
Ikegami

(10) Patent No.: US 10,635,920 B2
(45) Date of Patent: Apr. 28, 2020

(54) INFORMATION PROCESSING APPARATUS, INFORMATION PROCESSING METHOD AND STORAGE MEDIUM

(71) Applicant: CANON KABUSHIKI KAISHA, Tokyo (JP)

(72) Inventor: Hideyuki Ikegami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 15/643,365

(22) Filed: Jul. 6, 2017

(65) Prior Publication Data
US 2018/0018531 A1 Jan. 18, 2018

(30) Foreign Application Priority Data

Jul. 15, 2016 (JP) ................. 2016-140692

(51) Int. Cl.
*G06K 9/00* (2006.01)
*G06K 9/20* (2006.01)
*G06K 9/46* (2006.01)

(52) U.S. Cl.
CPC ....... *G06K 9/2081* (2013.01); *G06K 9/00228* (2013.01); *G06K 9/00369* (2013.01); *G06K 9/00771* (2013.01); *G06K 9/4642* (2013.01)

(58) Field of Classification Search
CPC . G06K 9/2081; G06K 9/00369; G06K 9/4642
See application file for complete search history.

(56) References Cited

U.S. PATENT DOCUMENTS

| 9,818,026 B2* | 11/2017 | Chou ................... G06T 7/11 |
| 2005/0183038 A1* | 8/2005 | Yamamoto ........... G06F 3/0482 |
| | | 715/838 |
| 2010/0226532 A1* | 9/2010 | Hayasaka ............ G06K 9/6203 |
| | | 382/103 |
| 2015/0178317 A1* | 6/2015 | Spielberg ............. G06F 16/58 |
| | | 382/165 |

FOREIGN PATENT DOCUMENTS

JP 2012-108785 A 6/2012

* cited by examiner

*Primary Examiner* — Shefali D Goradia
(74) *Attorney, Agent, or Firm* — Canon U.S.A., Inc. I.P. Division

(57) ABSTRACT

An information processing apparatus includes a display unit that displays an image on a display device, a specifying unit that specifies a selection region selected in the displayed image, and a determining unit that determines a detection parameter for use in object detection processing based on a feature of an object within the specified selection region.

15 Claims, 14 Drawing Sheets

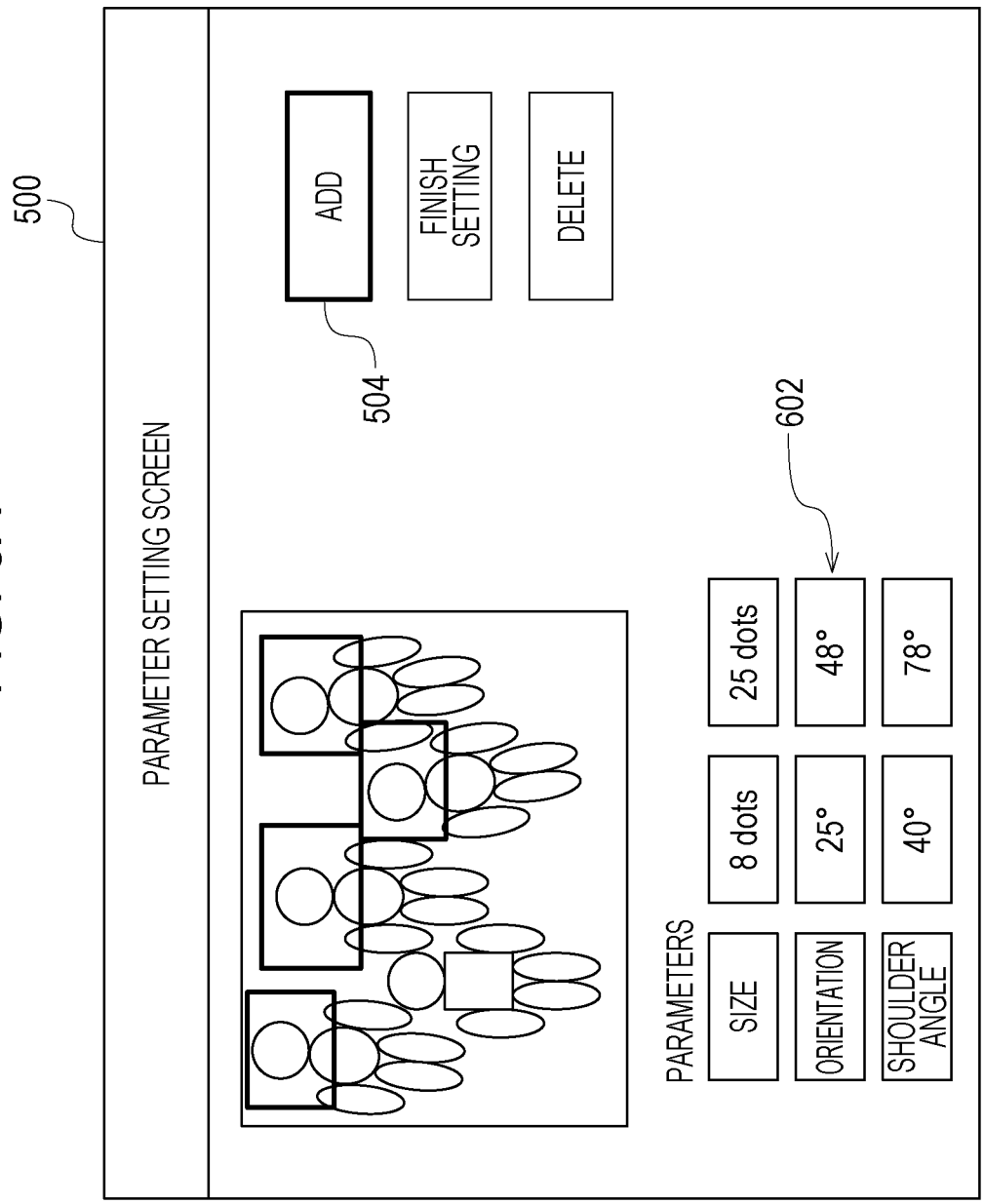

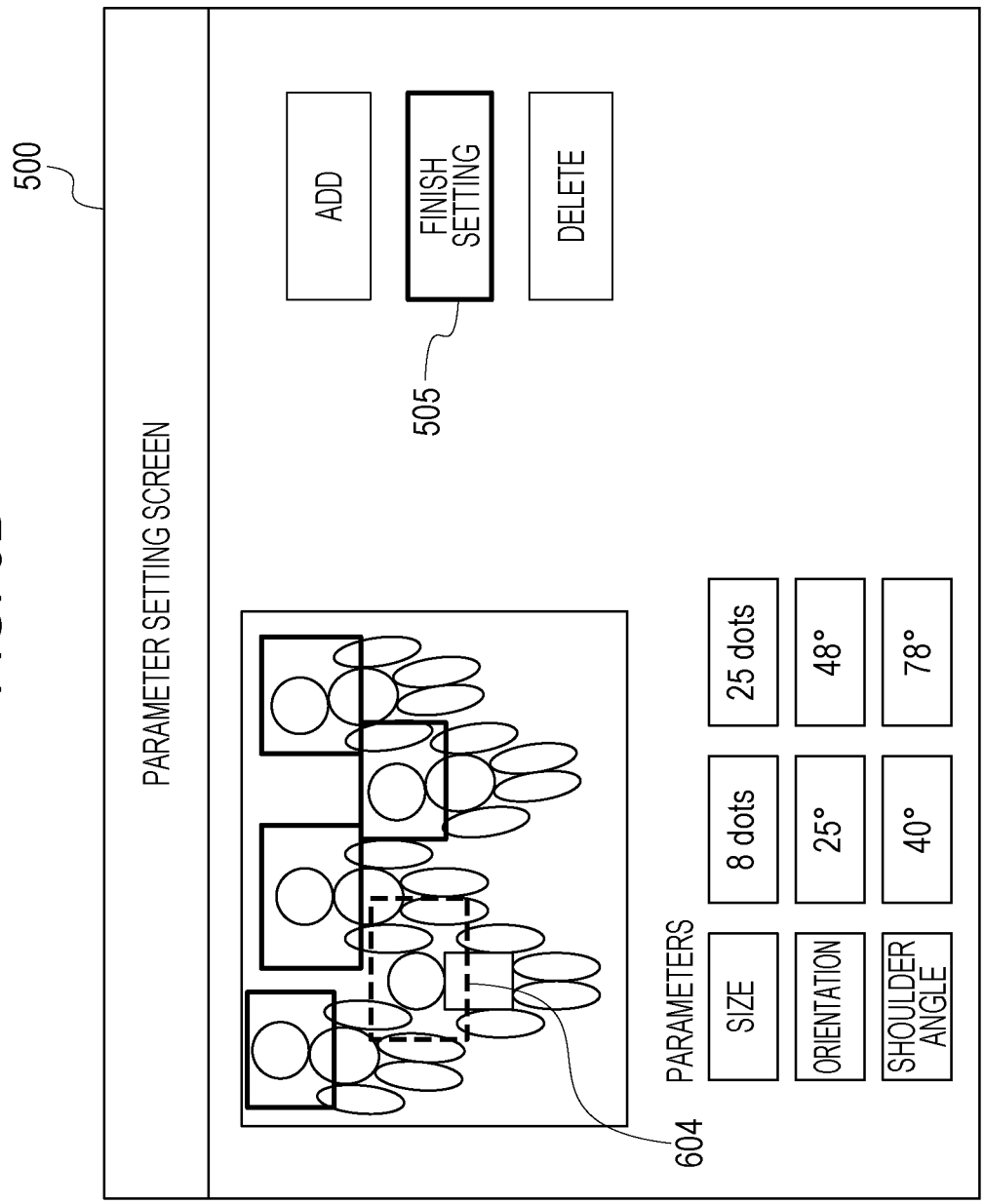

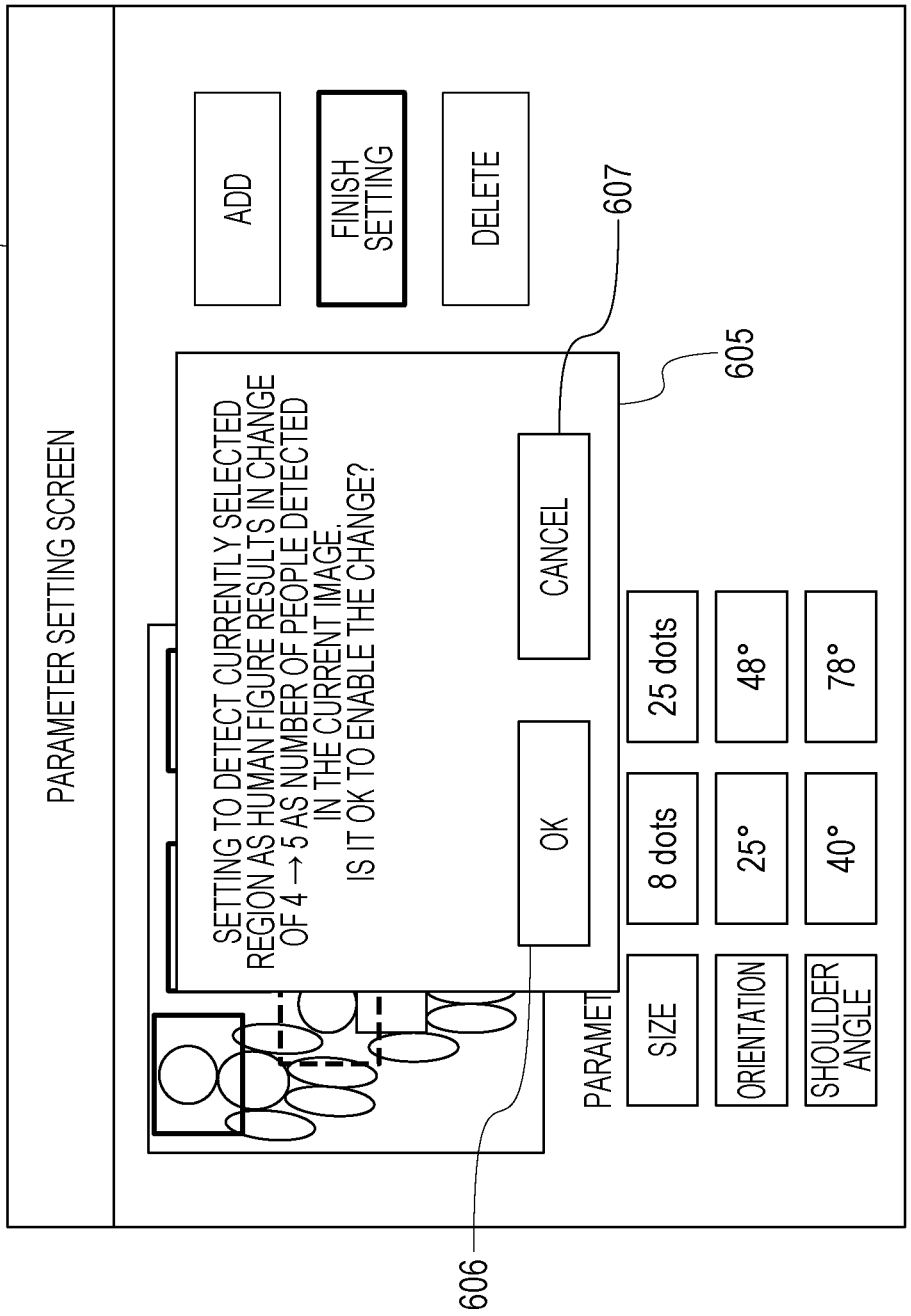

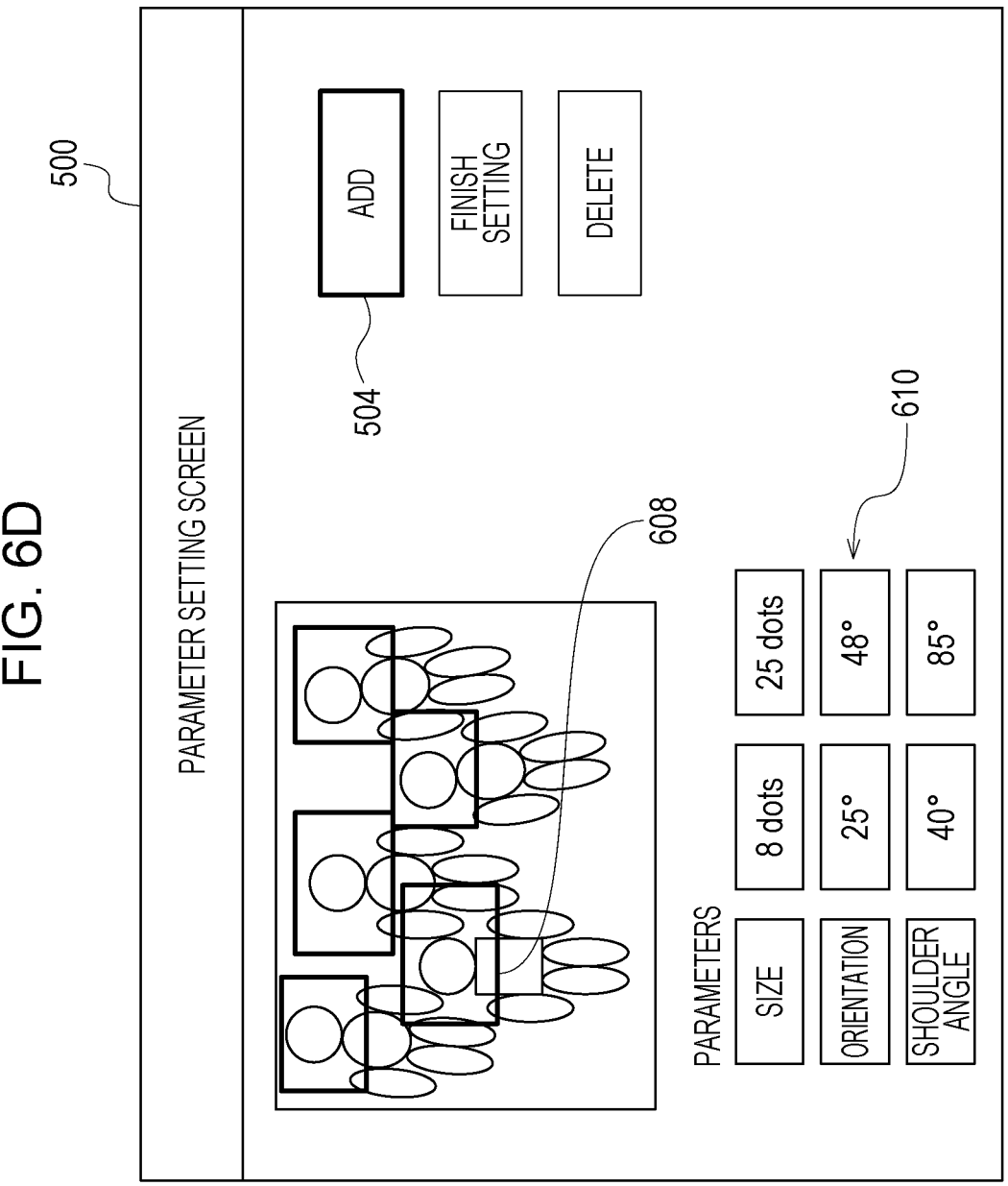

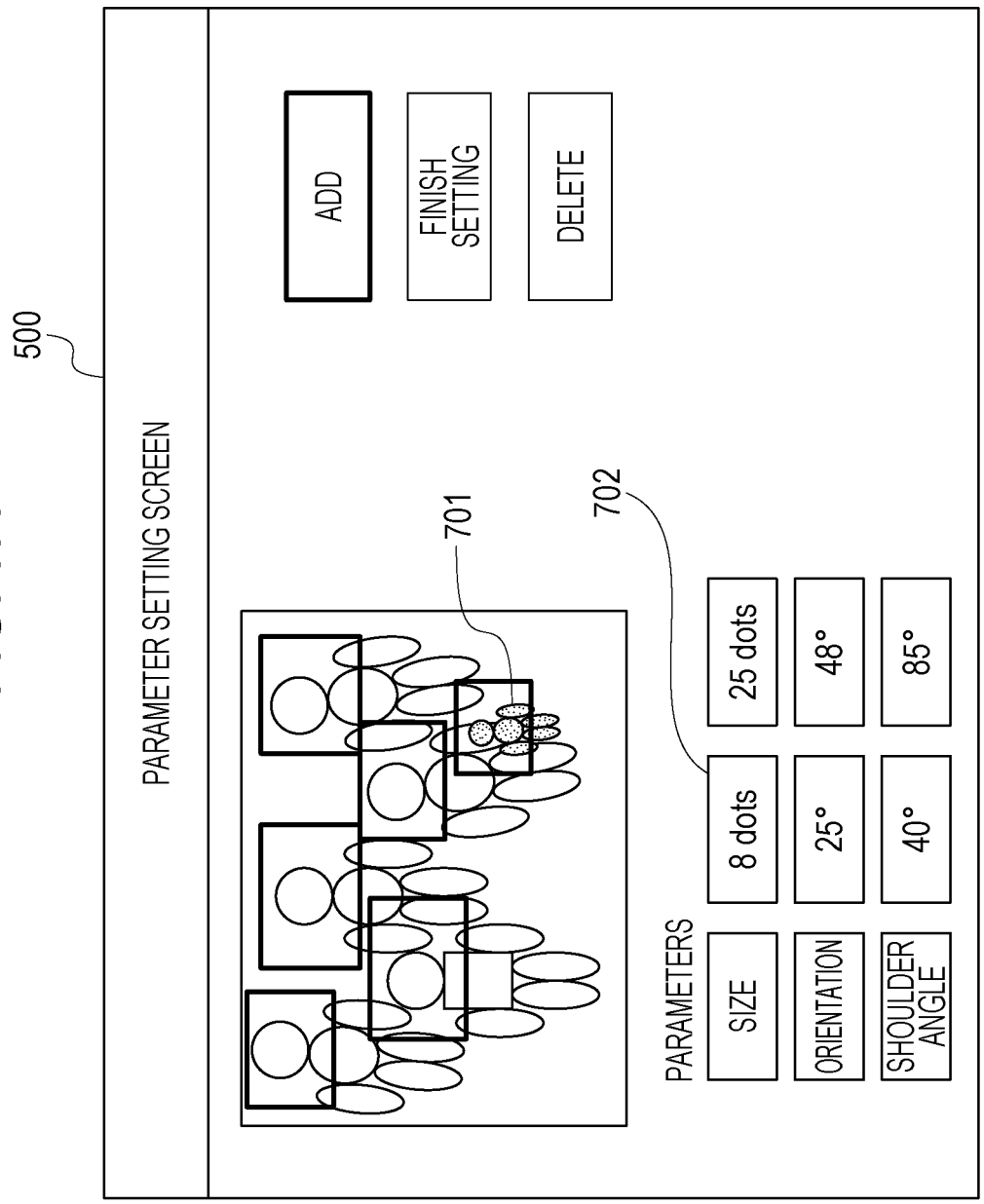

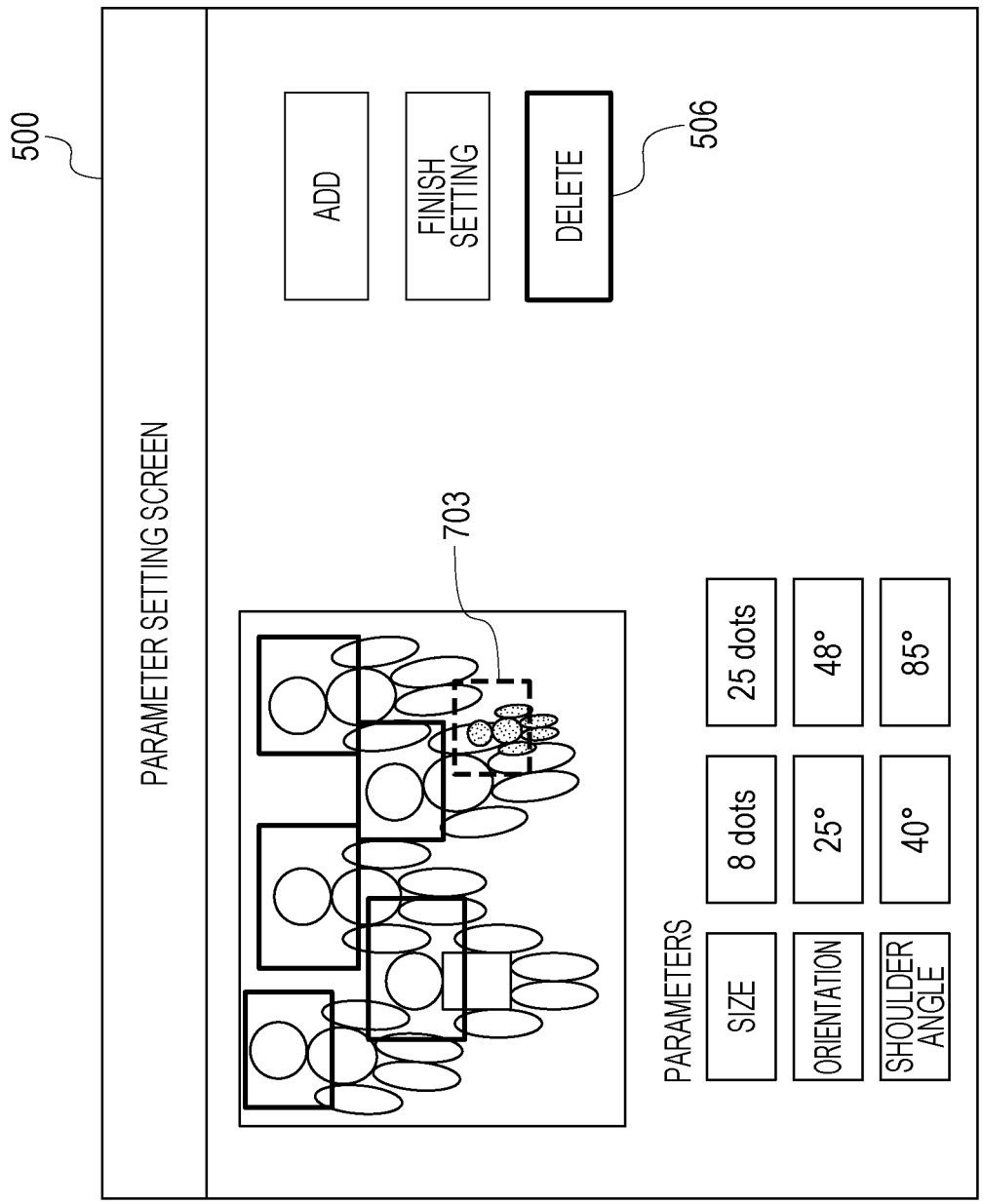

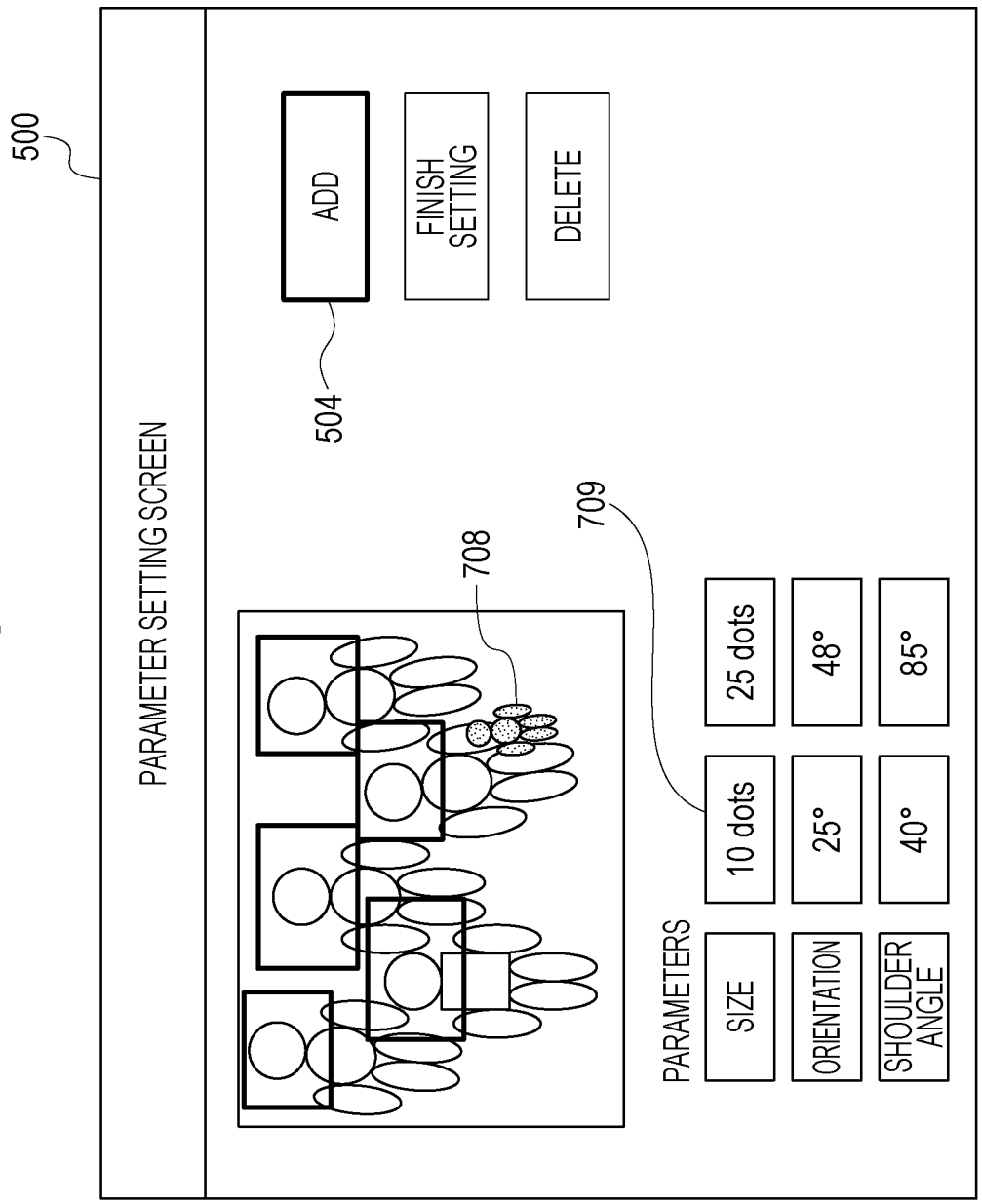

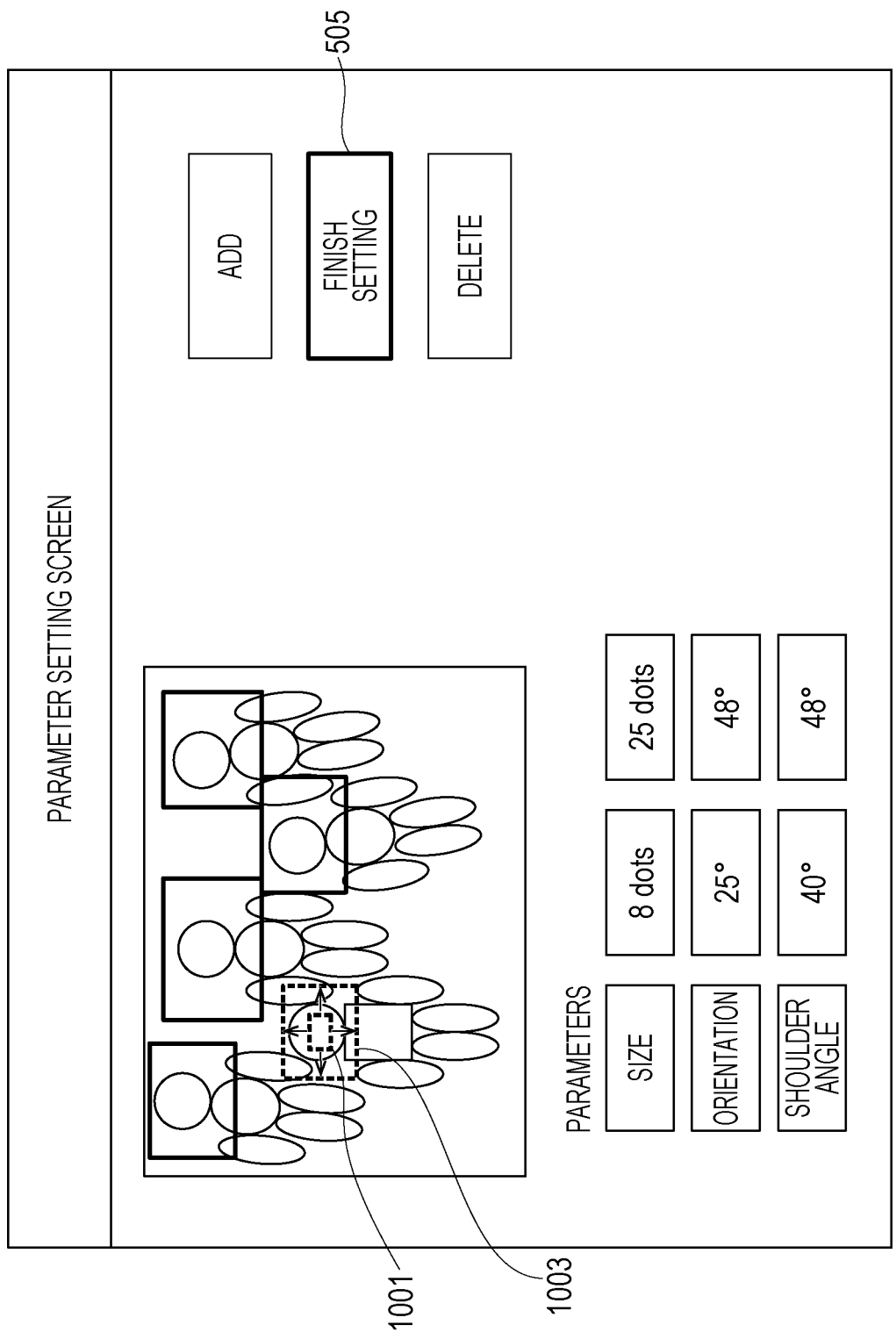

US 10,635,920 B2

INFORMATION PROCESSING APPARATUS, INFORMATION PROCESSING METHOD AND STORAGE MEDIUM

BACKGROUND

Field

The present disclosure relates to a technology for detecting an object in an image in an information processing apparatus.

Description of the Related Art

Conventionally, a technology has been known which detects an object, such as a human body, from an image. Such a technology for detecting an object can be utilized for various conditions, such as counting the number of people in a stadium or counting the number of visitors in an amusement park. Japanese Patent Laid-Open No. 2012-108785 discloses a technology for counting the number of people by detecting people with high accuracy and at a high speed even when a plurality of human figures are close to each other.

Human figure detection rate can vary in accordance with the conditions of scenes. In other words, fixing detection parameters relating to detection of an object can result in misdetection of an unintended object or in detection of a reduced number of people. In order to increase the accuracy of object detection, detection parameters relating to object detection can be adjusted in accordance with a given condition. However, it can be difficult for a user to determine how a detection parameter is to be set for a given condition. Even according to Japanese Patent Laid-Open No. 2012-108785, it is difficult for a user to appropriately set a detection parameter.

What is needed is for users to easily set a detection parameter for use in object detection processing.

SUMMARY

An information processing apparatus according to an aspect of the present disclosure includes a display unit configured to display an image on a display device, a specifying unit configured to specify a selection region selected in the displayed image, and a determining unit configured to determine a detection parameter for use in object detection processing based on a feature of an object within the specified selection region.

Further features will become apparent from the following description of exemplary embodiments with reference to the attached drawings.

BRIEF DESCRIPTION OF THE DRAWINGS

FIGS. 6A to 6D illustrate an example of processing for adjusting a detection parameter.

FIGS. 7A to 7D illustrate another example of processing for adjusting a detection parameter.

FIG. 10 illustrates processing for adjusting a frame.

DESCRIPTION OF THE EMBODIMENTS

Embodiments will be described below with reference to drawings.

First Embodiment

Figure 1:
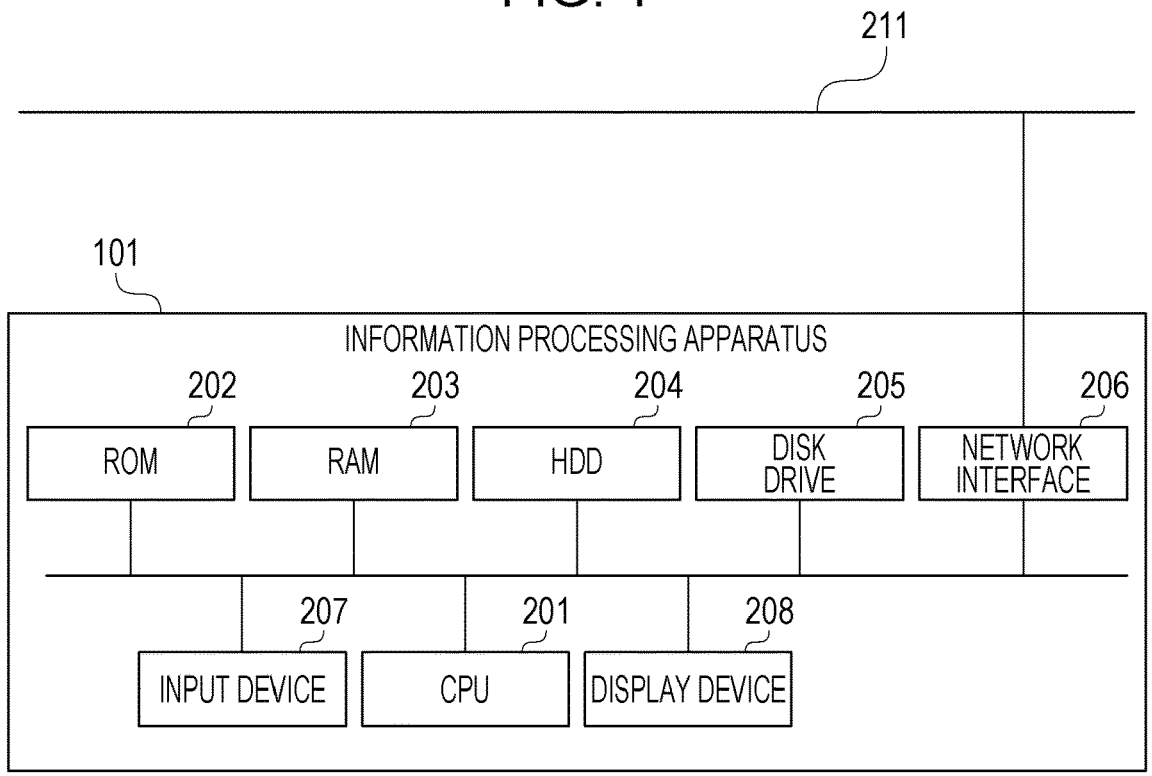
FIG. 1 is a diagram illustrating an example of a hardware configuration of an information processing apparatus.

FIG. 1 illustrates an example of a hardware configuration of an information processing apparatus 101 according to a first embodiment. The information processing apparatus 101 includes a CPU 201, a ROM 202, a RAM 203, an HDD 204, a disk drive 205, a network interface 206, an input device 207, and a display device 208. The CPU 201, the ROM 202, the RAM 203, the HDD 204, the disk drive 205, the network interface 206, the input device 207, and the display device 208 are connected to each other via a system bus in the information processing apparatus 101. The network interface 206 is connected to a network 211.

The CPU 201 is a control device such as a central processing unit (CPU) configured to control the information processing apparatus 101. The ROM 202 is a storage device configured to store a program to be used by the CPU 201 for controlling the information processing apparatus 101. The information processing apparatus 101 can have a secondary storage device instead of the ROM 202. The RAM 203 is a memory functioning as a work area for the CPU 201, and a program read from the ROM 202 to the CPU 201 is decompressed in the RAM 203. The RAM 203 can also function as a temporary memory or a storage area configured to temporarily store data to be processed.

The HDD 204 is a storage device configured to store an image file 111 and data, such as information regarding a detection parameter, for use in object detection processing to be performed by the detecting unit 102, which will be described with reference to FIG. 2. The image file 111 is a file of an image on which the information processing apparatus 101 according to the present embodiment performs object detection. An image corresponding to the image file 111 is an example of an input image. The CPU 201 is configured to acquire the image file 111 from the HDD 204. In a case where the image file 111 is stored in another storage device (such as the ROM 202, an external storage device, or a storage medium installed in the disk drive 205), the information processing apparatus 101 may not have the HDD 204. The disk drive 205 is a drive in which a storage medium, such as an optical disk or a flexible disk, can be installed and that acquires information, such as the image file 111, from the installed storage medium. In a case where the image file 111 and so on are prestored in another storage device (such as the ROM 202 or the HDD 204), the information processing apparatus 101 may not have the disk drive 205.

The network interface 206 is a circuit used for communication with an external apparatus over the network 211. The CPU 201 can acquire, over the network 211, data, such as the image file 111, from an external storage device to which the CPU 201 is connected. In a case where the image file 111 is stored in another storage device (such as the ROM 202 or the HDD 204), the information processing apparatus 101 may not have the network interface 206.

The display device 208 is a device, such as a display, that, for example, can display an image and a frame of a region. Though FIG. 1 illustrates the display device 208 included in the information processing apparatus 101, the information processing apparatus 101 and the display device 208 can be provided separately. In this case, the CPU 201 in the information processing apparatus 101 can perform display control for displaying an image on the display device 208 provided externally to the information processing apparatus 101. The input device 207 can include a keyboard usable for inputting a numerical value and text and a pointing device usable for instructing a specific display position in a display region on the display device 208, and can, for example, include a mouse and a touch panel.

The CPU 201 can, for example, execute a process based on a program stored in the ROM 202 or the HDD 204 to implement a function of the information processing apparatus 101, which will be described below with reference to FIG. 2, and a number-of-people counting application, which will be described below with reference to FIG. 3. The CPU 201 can further execute a process based on a program stored in the ROM 202 or the HDD 204 to implement, for example, processing that will be described below with reference to the flowcharts in FIGS. 8 and 9.

The hardware configuration of the information processing apparatus 101 as described above can, for example, include hardware components similar to hardware components installed in a personal computer (PC). The information processing apparatus 101 according to the present embodiment can be implemented by an information processing apparatus such as a PC, a tablet apparatus, or a server apparatus. Functions, which will be described below with reference to FIG. 2, of the information processing apparatus 101 according to the present embodiment can be implemented as applications that can run on an information processing apparatus, such as a PC.

Figure 2:
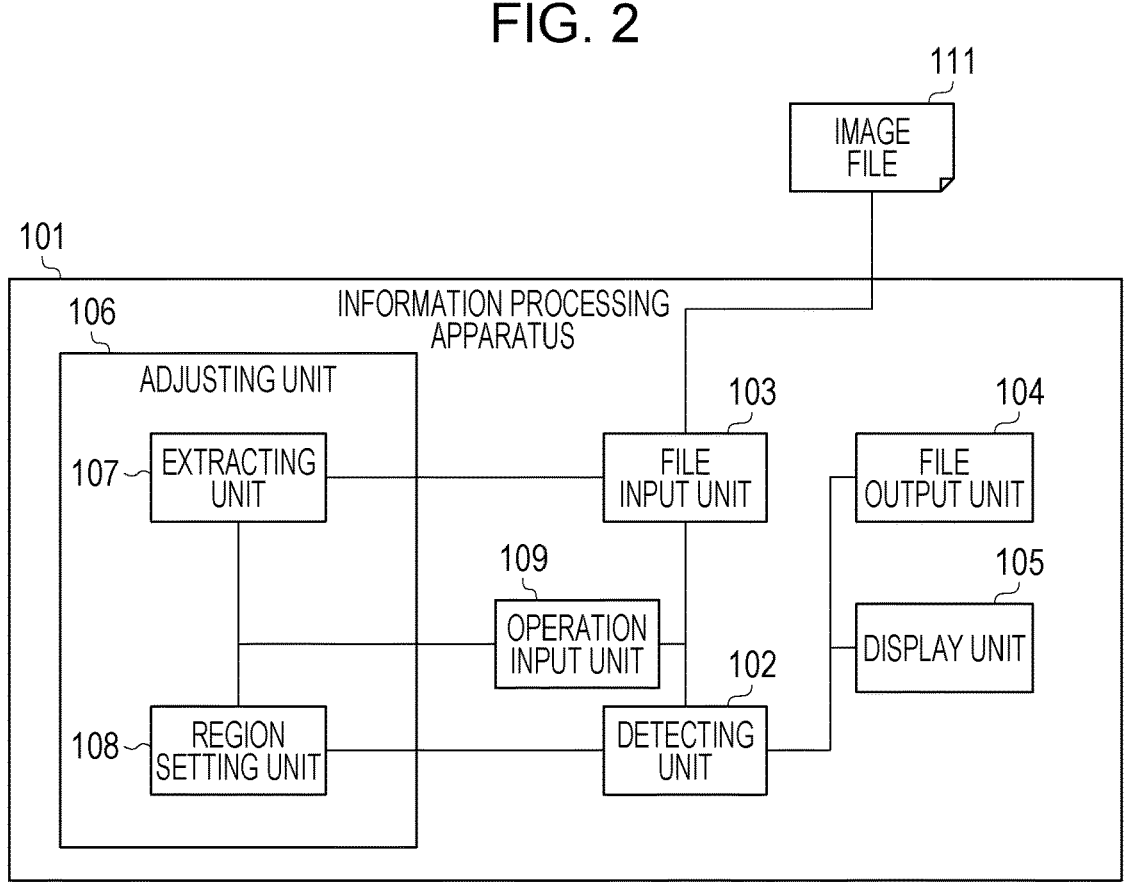
FIG. 2 illustrates an example of a functional configuration and so on in the information processing apparatus.

FIG. 2 illustrates an example of a functional configuration of the information processing apparatus 101 according to the present embodiment. The information processing apparatus 101 includes a detecting unit 102, a file input unit 103, a file output unit 104, a display unit 105, an adjusting unit 106, and an operation input unit 109. The adjusting unit 106 includes an extracting unit 107 and a region setting unit 108.

The detecting unit 102 is configured to detect a detection target object from the image file 111 acquired from the file input unit 103. The detecting unit 102 is configured to acquire information, which is stored in the HDD 204, for example, regarding a detection parameter to be used in detection processing and use the detection parameter corresponding to the acquired information for the processing for detecting an object. The detection parameter is a parameter used in processing for detecting an object to be performed by the detecting unit 102. The file input unit 103 is configured to acquire the image file 111 from which an object is detected, from, for example, the ROM 202, the HDD 204, a storage medium installed in the disk drive 205, or an external storage device.

The file output unit 104 is configured to store, in a file format, a result of detection of an object performed by the detecting unit 102 into, for example, the ROM 202 or the HDD 204 for output. The display unit 105 is configured to display a result of detection of an object performed by the detecting unit 102 on the display device 208. The adjusting unit 106 is configured to adjust a detection parameter to be used in object detection processing to be performed by the detecting unit 102 and determine the value or values of the detection parameter. The operation input unit 109 is configured to receive a user's operation through the input device 207.

The adjusting unit 106 includes the extracting unit 107 and the region setting unit 108. The extracting unit 107 is configured to extract, for example, a feature from the image file 111 acquired by the file input unit 103 or a region selected by the region setting unit 108. The region setting unit 108 is configured to select a region in the image file 111 acquired by the file input unit 103 based on a user's operation received by the operation input unit 109.

According to the present embodiment, the information processing apparatus 101 is configured to detect a detection target object or objects from an input image and execute an application for counting the number of the detected object or objects. According to the present embodiment, it is assumed that a human face is a detection target object. In other words, according to the present embodiment, the information processing apparatus 101 is configured to detect a human face or faces from an input image and execute a number-of-people counting application for counting the number of detected human face or faces, i.e., the number of people.

Figure 3:
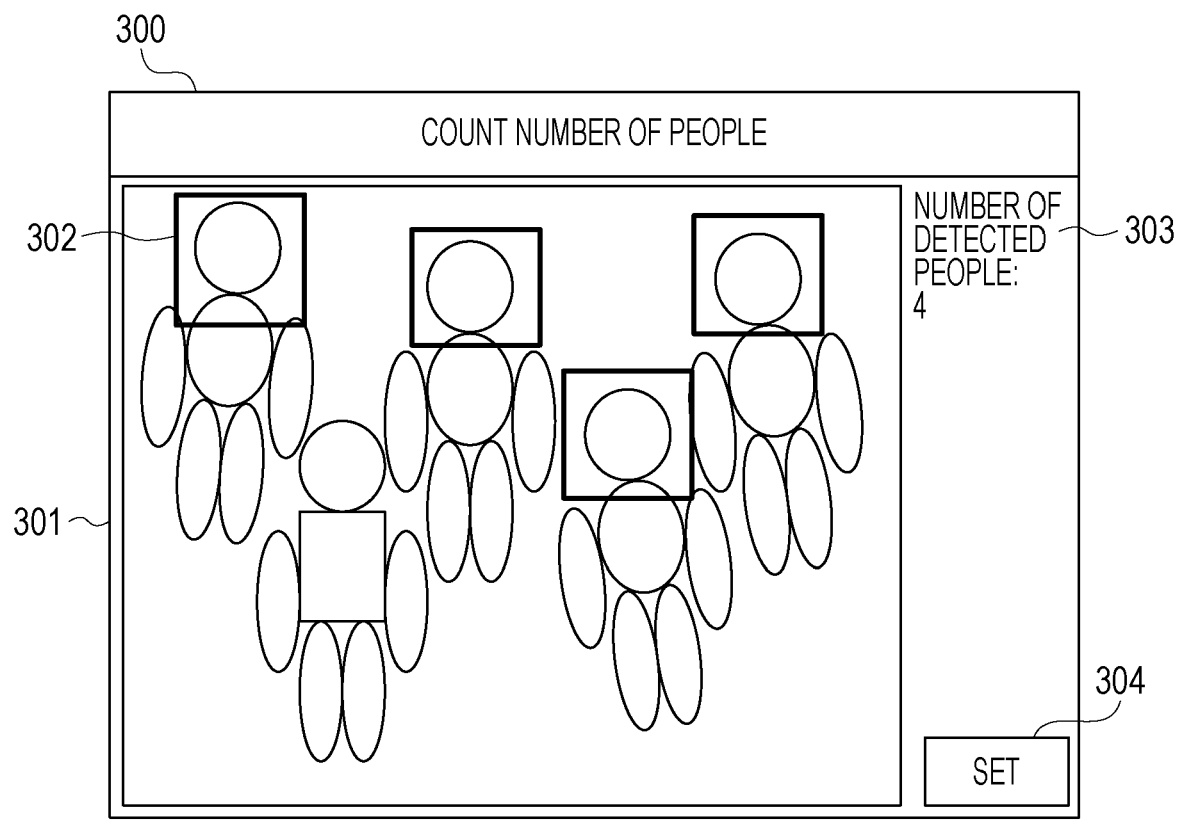
FIG. 3 illustrates an example of a start screen.

FIG. 3 illustrates an example of a start screen of the number-of-people counting application executed by the information processing apparatus 101 according to the present embodiment. A start screen 300 is an example start screen of the number-of-people counting application. A display region 301 is a region where an input image is to be displayed and where an image corresponding to the image file 111 is displayed according to the present embodiment. A frame 302 indicating an object detected by the detecting unit 102 is displayed on a display screen in the display region 301, and a human face within the frame is detected in the example. A display region 303 displays information indicating the number of currently detected objects (the number of people). Referring to the example in FIG. 3, four human faces are detected by the detecting unit 102 from an image corresponding to the image file 111. A SET button 304 is a button selected in shifting to a detection parameter setting screen. The processing performed when the SET button is pressed will be described in detail below with reference to FIG. 5.

The display unit 105 is configured to display the start screen 300 on the display device 208 when the number-of-people counting application is started. The display unit 105 displays an image corresponding to the image file 111 acquired by the file input unit 103 in the display region 301 of the start screen 300. When the number-of-people counting application is started, the detecting unit 102 executes processing for detecting a human face as a detection target object in the image corresponding to the image file 111. The display unit 105 displays the frame 302 indicating a result of the detection processing performed by the detecting unit 102 over the image corresponding to the image file 111 in the display region 301.

The display unit 105 can display, in the display region 303, information such as text indicating how many objects have been detected as a result of the detection processing performed by the detecting unit 102. If, based on a user's operation received by the operation input unit 109 through the input device 207, selection of the SET button 304 is detected, the display unit 105 displays a setting screen 500, which will be described below with reference to FIG. 5, on the display device 208.

Figure 4:
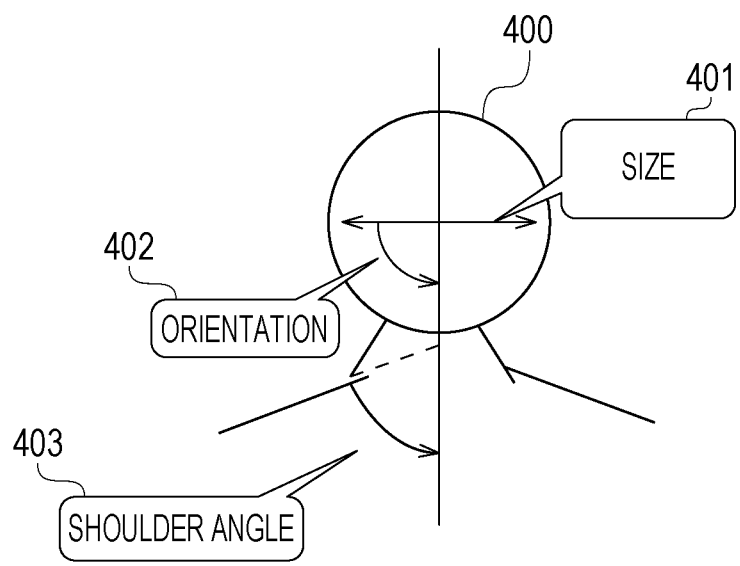
FIG. 4 illustrates example features of an object.

FIG. 4 illustrates detection parameter examples used in detecting a human face. According to the present embodiment, the detecting unit 102 detects a human face in an image based on features illustrated in FIG. 4, and counts the detected human face to count the number of people. FIG. 4 illustrates the size of a head (hereinafter, head size), the orientation of a head (hereinafter, head orientation) and an angle of a shoulder (hereinafter, shoulder angle) as features used in detecting a human face. The detecting unit 102 can detect, from an input image, an edge of the image to generate its outline. In the example in FIG. 4, the detecting unit 102 generates an outline 400.

For example, in order to detect a human face, the detecting unit 102 can determine whether the object corresponding to the outline 400 is a human face based on the generated outline 400. The detecting unit 102 can calculate a head size 401, a head orientation 402, and a shoulder angle 403 based on, for example, the outline 400. The head size 401 is, for example, a width of a region occupied by a head in an image. The head orientation 402 is, for example, an angle indicating an orientation of a face in an image. The shoulder angle 403 is, for example, an angle indicating a gradient of a shoulder part. If all of the head size 401, the head orientation 402, and the shoulder angle 403 fall within preset corresponding ranges, the detecting unit 102 detects that the object corresponding to the outline 400 is a human face. The ranges set for features of a head size, a head orientation, and a shoulder angle are examples of detection parameters for use in object detection processing performed by the detecting unit 102.

Figure 5:
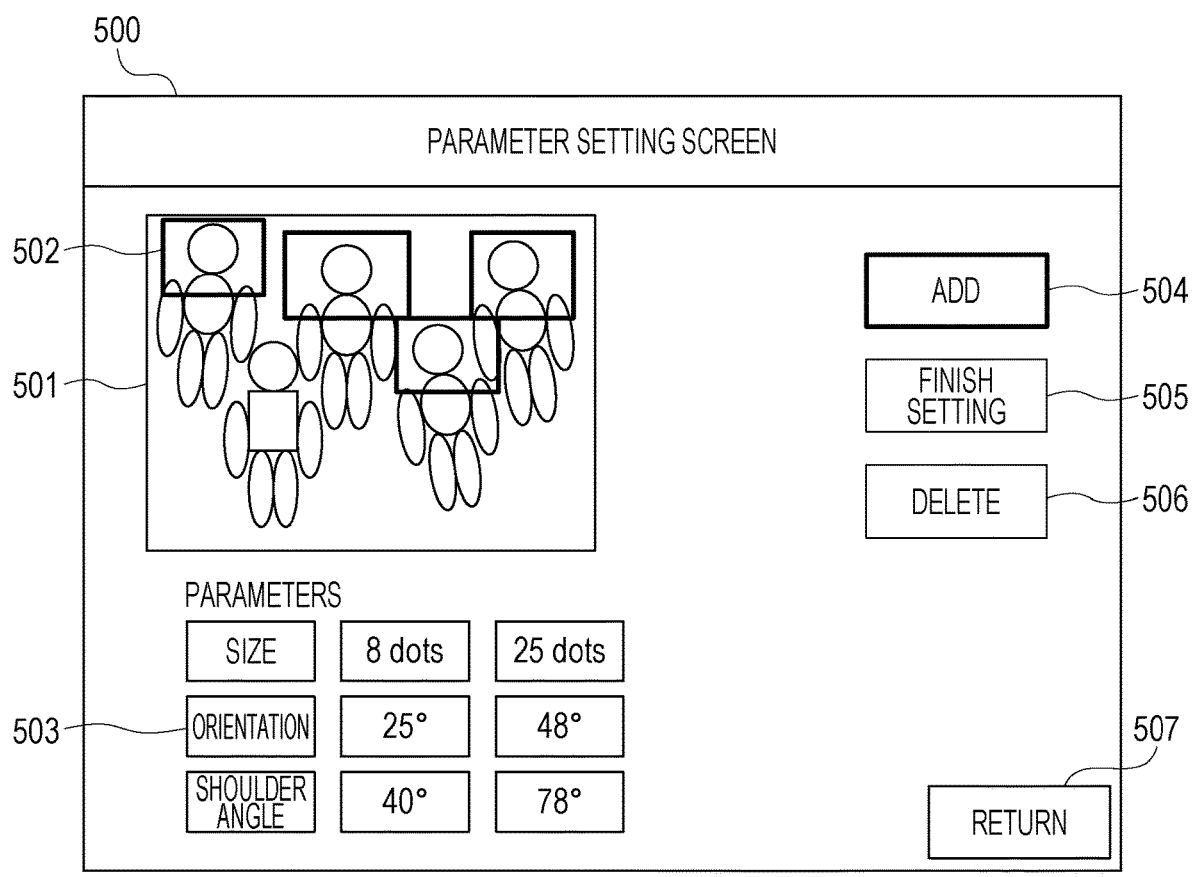
FIG. 5 illustrates an example setting screen.

FIG. 5 illustrates an example of a setting screen 500 displayed when the SET button 304 is selected. The display unit 105 displays the setting screen 500 on the display device 208 in a case where the SET button 304 is selected on the start screen 300. A display region 501 is a display region displaying an input image to be detected (the image corresponding to the image file 111). The display unit 105 displays in the display region 501 a frame 502 indicating a detected object over the image corresponding to the image file 111.

A display region 503 is a display region displaying information indicating detection parameters for use in object detection processing. The information displayed in the display region 503 indicates ranges each defining a feature calculated from the outline generated by the detecting unit 102 as a detection target object. According to the present embodiment, the display unit 105 can change the information displayed in the display region 503 based on a user's operation through the input device 207. When the information displayed in the display region 503 is changed, the detecting unit 102 can detect an object from the image corresponding to the image file 111 again based on the detection parameter corresponding to the changed information. In this case, the display unit 105 can display in the display region 501 a result of the detection processing performed by the detecting unit 102 after the change.

An ADD button 504, a FINISH SETTING button 505, and a DELETE button 506 are buttons for use in processing for adjusting a detection parameter. The ADD button 504 and the FINISH SETTING button 505 will be described in detail with reference to FIGS. 6A to 6D. The DELETE button 506 will be described in detail with reference to FIGS. 7A to 7D. A RETURN button 507 is a button used for returning to the start screen 300. When the RETURN button 507 is selected, the display unit 105 displays the start screen 300 on the display device 208 again.

FIGS. 6A to 6D illustrate an example of detection parameter adjustment processing. FIG. 6A is an example of the setting screen 500 before the ADD button 504 is pressed. Detection parameters 602 are detection parameters currently used by the detecting unit 102 in the object detection processing. For example, a shoulder angle feature ranges from 40° to 78°

If selection of the ADD button 504 is detected in FIG. 6A, the display unit 105 shifts the setting screen to an addition mode. In the addition mode, a user is prompted to select a region that is not currently being detected as an object, but is to be detected as a detection target object. According to the present embodiment, a region is selected based on a user's drag operation received by the operation input unit 109 through the input device 207 on the display screen. The display region 501 after the ADD button 504 is selected is an example of a first selection screen used for selecting a region including an object to be detected in an input image.

FIG. 6B illustrates an example of a state in which a region to be detected as a detection target object in the addition mode is selected. A selection region 604 is a region selected by a user as a region to be detected as a detection target object. The display unit 105 displays a line of a frame of the selection region 604 by using different tint and thickness from that of the frame 502 such that the selection region 604 is distinguishable from a region that actually detected. The display unit 105 only displays the FINISH SETTING button 505 as selectable.

If the operation input unit 109 detects selection of the FINISH SETTING button 505, the adjusting unit 106 can, for example, perform the following processing. The adjusting unit 106 extracts an edge from the selection region 604 and generates an outline based on the extracted edge. The adjusting unit 106 extracts features of head size, head orientation, and shoulder angle from the generated outline. The adjusting unit 106 compares the extracted features and the ranges indicated by the detection parameters 602. If at least one of the extracted features is not included in the range indicated by the detection parameter 602, the adjusting unit 106 determines the corresponding ranges indicated by the detection parameters 602 so as to include the extracted features and defines the determined ranges as candidate parameters for detection parameters. For example, the shoulder angles 40° to 78° indicate a range indicated in the corresponding detection parameters 602. If the shoulder angle of the outline extracted from the selection region 604 is 84° and if the range to be indicated in the detection parameters 602 includes 84°, the selection region 604 is also detected by the detecting unit 102. Then, the adjusting unit 106 determines a range of, for example, 40° to 85°, as a candidate parameter for the detection parameter of the shoulder angle.

The detecting unit 102 detects an object from an image corresponding to the image file 111 again by using the candidate parameter determined by the adjusting unit 106 for the detection parameter and transmits information regarding how many objects have been detected to the display unit 105. The display unit 105 displays a pop-up display screen 605 on the display device 208, as illustrated in FIG. 6C, when receiving the information regarding how many objects have been detected based on the candidate parameter from the detecting unit 102. The pop-up display screen 605 can include information indicating how many objects are to be detected from the current image in a case where the detecting unit 102 is caused to detect the selection region 604 as a detection target object. How many objects are to be detected can be indicated by the number indicated by the information transmitted from the detecting unit 102.

The pop-up display screen 605 includes an OK button 606 and a CANCEL button 607 used in selecting whether a candidate parameter is to be adopted as a detection parameter to be actually used by the detecting unit 102. If the operation input unit 109 detects selection of the OK button 606, the adjusting unit 106 updates the information, which is stored in the HDD 204, regarding a detection parameter to be used in detection processing performed by the detecting unit 102 with the data of the candidate parameter. When the detecting unit 102 updates the information regarding the detection parameter, the display unit 105 changes data in the display region 503 to the data of the updated detection parameter, as illustrated in FIG. 6D. FIG. 6D illustrates an example of the setting screen 500 resulting from the change in display of a detection parameter.

If the operation input unit 109 detects selection of the CANCEL button 607, the display unit 105 can display the display screen illustrated in FIG. 6A on the display device 208. The pop-up display screen 605 and a pop-up display screen 705, which will be described with reference to FIGS. 7A to 7D, are examples of adoption selection screens for selecting whether a candidate parameter is to be actually adopted in object detection processing.

FIG. 6D illustrates an example state after the OK button 606 is selected. As indicated by the detection parameter 610, the shoulder angle range is changed to 40° to 85°. On the setting screen 500 in FIG. 6D, the ADD button 504 is only returned to a selectable state, and the selection region 604 as indicated within the frame 608 is recognized as a human face being a detection target object.

According to the present embodiment, a user can select a region that has not been detected as a detection target object while checking the display region 501 so that the adjusting unit 106 can adjust a detection parameter to detect the selection region. In other words, the information processing apparatus 101 can provide a technology enabling a user to select a region to be detected to appropriately update a detection parameter.

The information processing apparatus 101 presents a detection result, in a case where a detection parameter is changed, to a user through the pop-up display screen 605. Thus, a user can check what kind of detection result can be acquired in a case where a detection parameter is changed so that, if the detection result is not desirable, the user can cancel the change of the detection parameter. In other words, the information processing apparatus 101 can reduce the possibility that a change of a detection parameter can deteriorate the detection accuracy.

Figure 7C:
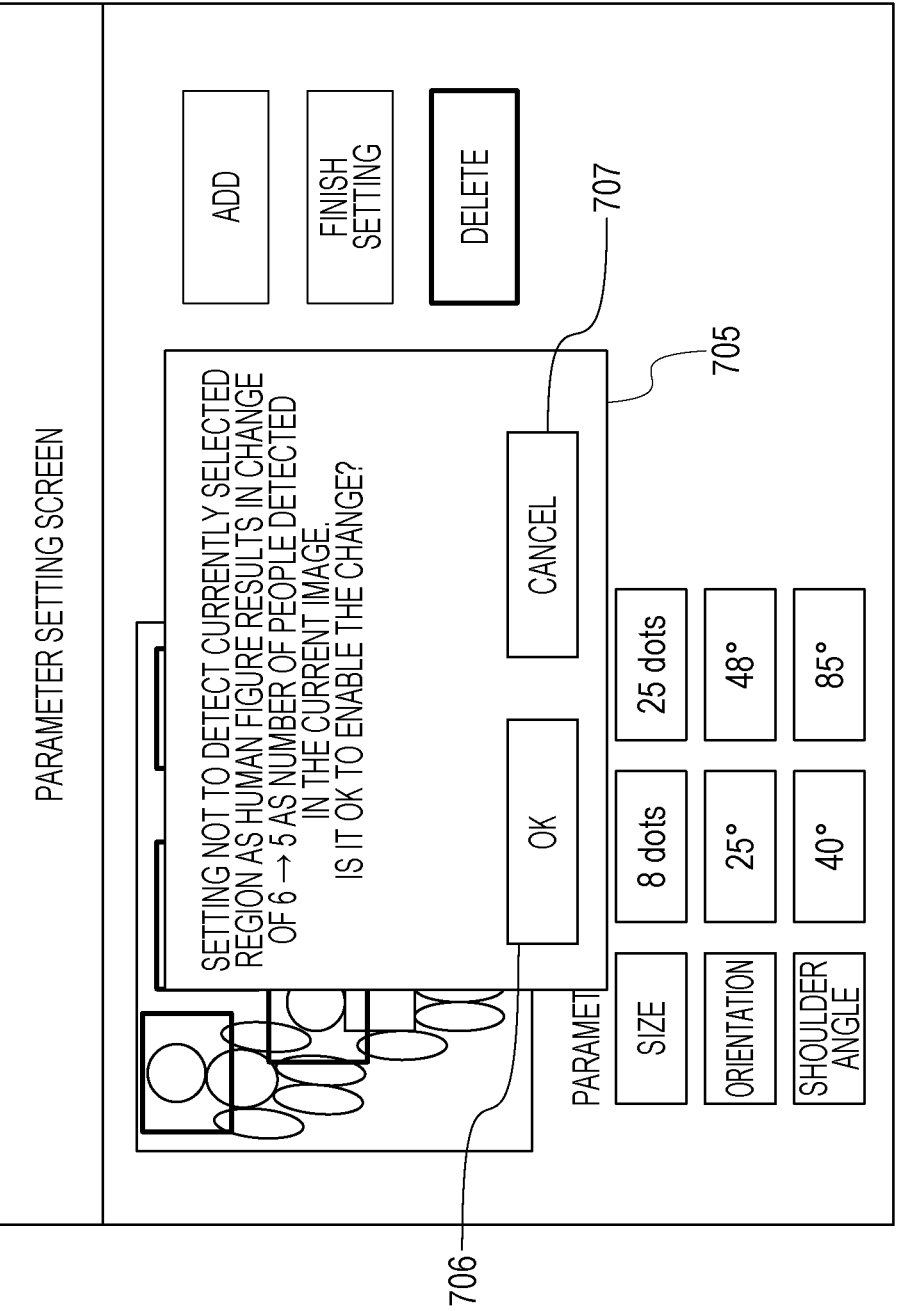

Processing for adjusting a detection parameter in case where the DELETE button 506 is selected will be described with reference to FIGS. 7A to 7D. FIG. 7A illustrates an example of the setting screen 500. In the example illustrated in FIG. 7A, the face of a doll carried by a human figure is detected in a frame 701 as a human face. Processing will be described that adjusts a detection parameter to prevent the face of the doll from being detected as a human face. A detection parameter 702 includes detection parameter values currently being used by the detecting unit 102 for object detection. A region corresponding to a frame displayed in the display region 501 is an alternative for selecting by a user a region not to be detected.

The display unit 105 changes the frame 701 to a selection region 703 as illustrated in FIG. 7B in a case where the operation input unit 109 detects selection of the frame 701 by a user's operation. More specifically, the display unit 105 changes the color or thickness of the frame 701 to generate the selection region 703. The display unit 105 only enables the DELETE button 506 to be selectable if a frame is selected in the display region 501 as a selection region. The display unit 105 returns the state of the setting screen 500 to the state illustrated in FIG. 7A if the operation input unit 109 detects selection of an arbitrary location excluding the DELETE button 506 on the setting screen 500. The display region 501 before the DELETE button 506 is selected is an example of a second selection screen used in selecting a region excluding a detection target object in an input image.

If selection of the DELETE button 506 is detected, the adjusting unit 106 performs, for example, the following processing. The adjusting unit 106 extracts an edge from the selection region 703 and generates an outline based on the extracted edge. The adjusting unit 106 then extracts features of head size, head orientation, and shoulder angle from the generated outline. The adjusting unit 106 compares the extracted features and the ranges indicated in the detection parameter 702. If at least one of the extracted detection parameters is included in the range indicated in the detection parameter 702, the adjusting unit 106 determines the ranges indicated in the detection parameter 702 so as to exclude the extracted detection parameter and defines the determined range as a candidate parameter for the detection parameter.

For example, in a case where the range indicated in the detection parameter 702 is a range of head size from 8 to 25 dots and where the head size extracted from the selection region 703 is equal to 9 dots, the object with the head size of 9 dots is not to be detected by the detecting unit 102 if 9 dots is outside the range indicated by the detection parameter. Accordingly, the adjusting unit 106 determines, for example, a range of 10 to 25 dots as a candidate parameter for the detection parameter of head size.

The detecting unit 102 detects an object from an image corresponding to the image file 111 again by using the candidate parameter determined by the adjusting unit 106 for the detection parameter and transmits information regarding how many objects have been detected to the display.

The display unit 105 displays a pop-up display screen 705 on the display device 208, as illustrated in FIG. 7C, when receiving information regarding how many objects have been detected based on the candidate parameter from the detecting unit 102. The pop-up display screen 705 can include information indicating how many objects are to be detected from the current image in a case where the detecting unit 102 is caused not to detect the selection region 703 as a detection target object. How many objects are to be detected can be indicated by the number indicated in the information transmitted from the detecting unit 102.

The pop-up display screen 705 includes an OK button 706 and a CANCEL button 707 used in selecting whether a candidate parameter is to be adopted as a detection parameter to be actually used by the detecting unit 102. If the operation input unit 109 detects selection of the OK button 706, the adjusting unit 106 updates a detection parameter stored in the HDD 204 and to be used in detection processing performed by the detecting unit 102 with the data of the candidate parameter. When the adjusting unit 106 updates the detection parameter, the display unit 105 changes data in the display region 503 to the data of the updated detection parameter, as illustrated in FIG. 7D. FIG. 7D illustrates an example of the setting screen 500 resulting from a change in display of a detection parameter. If the operation input unit 109 detects selection of the CANCEL button 707, the display unit 105 can display the display screen illustrated in FIG. 7A on the display device 208.

Referring to FIG. 7D, an ADD button 710 is only enabled as selectable. Referring to FIG. 7D, a detection parameter 709 after the change is displayed in the display region 503. FIG. 7D does not illustrate the frame 701, but illustrates that a doll object 708 is not detected as a human face.

According to the present embodiment, a user can select a region that has been detected as a detection target object while checking the display region 501 so that the adjusting unit 106 can adjust a detection parameter not to detect the selection region. In other words, the information processing apparatus 101 can provide a technology enabling a user to select a region not to be detected to appropriately update a detection parameter.

The information processing apparatus 101 presents to a user through the pop-up display screen 705 a detection result in a case where a detection parameter is changed. Thus, a user can check what kind of detection result can be acquired in a case where a detection parameter is changed so that, if the detection result is not desirable, the user can cancel the change of the detection parameter. In other words, the information processing apparatus 101 can reduce the possibility that a change of a detection parameter can deteriorate the detection accuracy.

Figure 8:
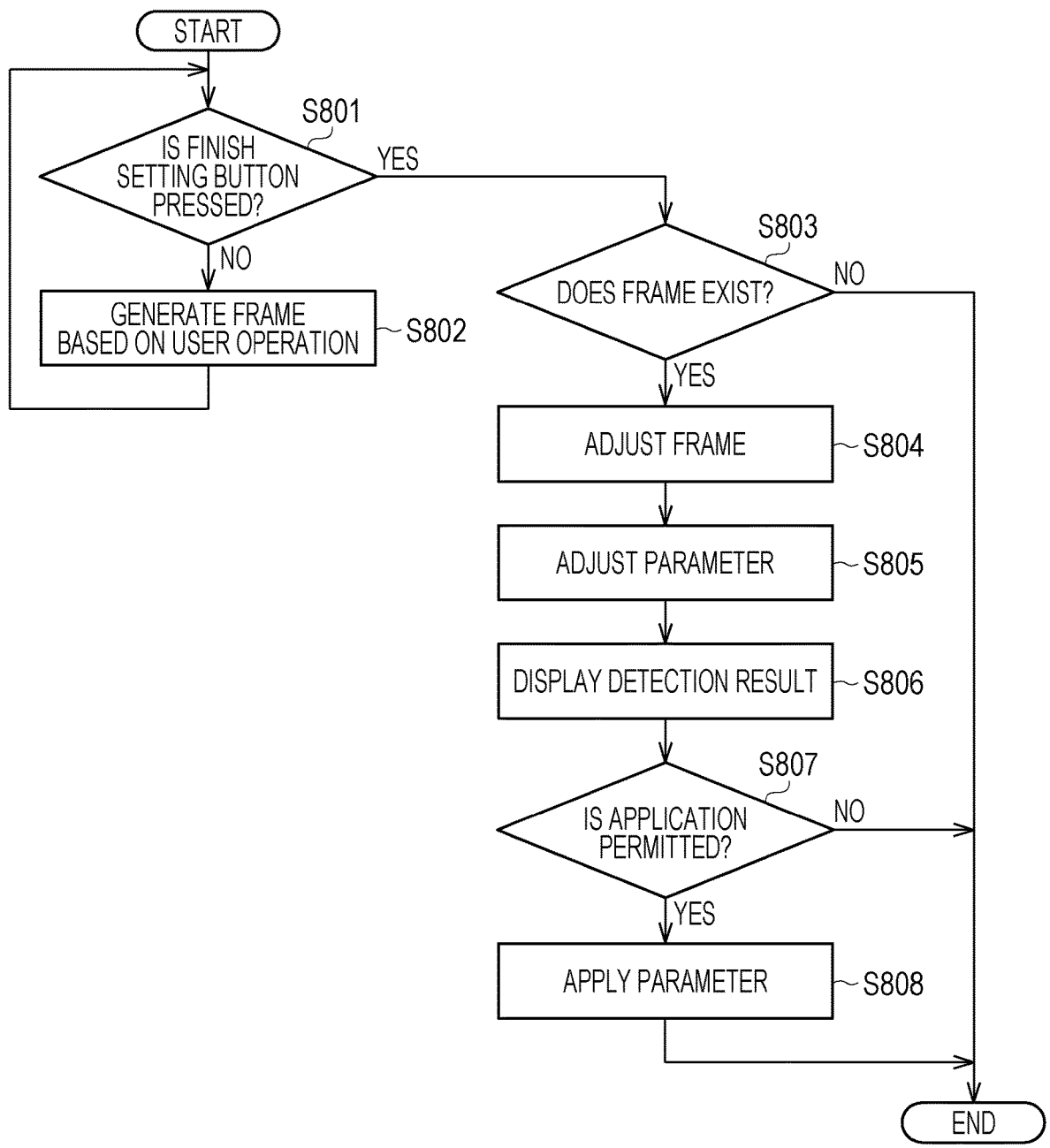
FIG. 8 is a flowchart illustrating an example of processing in the information processing apparatus.

Next, with reference to FIG. 8, the processing in FIGS. 6A to 6D will be described in detail. FIG. 8 is a flowchart illustrating an example of processing for adjusting a detection parameter so as to detect a region that is not detected. The processing illustrated in FIG. 8 is performed, for example, after the ADD button 504 is selected on the setting screen 500 illustrated in FIG. 6A.

In S801, the operation input unit 109 determines whether the FINISH SETTING button 505 on the setting screen 500 is selected by a user's operation through the input device 207. If the operation input unit 109 determines that the FINISH SETTING button 505 is selected, the processing moves to S803. If the operation input unit 109 determines that the FINISH SETTING button 505 is not selected, the processing moves to S802.

In S802, the operation input unit 109 receives designation of a frame on the display region 501 based on a user's operation through the input device 207, and the display unit 105 generates and displays a frame corresponding to the designation of the frame received by the operation input unit 109. The selection region 604 in FIG. 6B is an example of the region corresponding to the generated frame.

In S803, the adjusting unit 106 determines whether any frame generated in S802 exists. If the adjusting unit 106 determines that a frame generated in S802 exists, the processing moves to S804. If the adjusting unit 106 determines that no frame generated in S802 exists, the processing in FIG. 8 ends.

In S804, the adjusting unit 106 adjusts the size of the frame generated in S802. The processing for adjusting the frame size can include adjusting the size of the frame to a size equal to that of another detected frame if, for example, a user designates an excessively small region. The processing in S804 will be described in detail with reference to FIG. 10. In S805, the adjusting unit 106 adjusts the detection parameter based on the selection region corresponding to the frame generated in S802 and the current detection parameter and determines a candidate parameter that is a candidate for a new detection parameter.

If a feature extracted from the selection region corresponding to the frame generated in S802 is higher than an upper limit of the range indicated by the current detection parameter, the adjusting unit 106 can, for example, perform the following processing. That is, the adjusting unit 106 determines a range of a candidate parameter the upper limit of which is changed from the upper limit value of a range indicated by the current detection parameter to the value of the feature extracted from the selection region corresponding to the frame generated in S802.

For example, if the range of a shoulder angle parameter indicated by a current detection parameter is 40° to 78° and if a feature of shoulder angle extracted from the selection region corresponding to the frame generated in S802 is 85°, the adjusting unit 106 performs the following processing. That is, the adjusting unit 106 determines a range of 40° to 85° as the range of a candidate parameter relating to the shoulder angle. The adjusting unit 106 can determine a range of a candidate parameter the upper limit of which is changed from the upper limit value of a range indicated by the current detection parameter to a value acquired by adding a preset value (such as 1 or 2) to the value of the feature extracted from the selection region corresponding to the frame generated in S802.

If the value of the feature extracted from the selection region corresponding to the frame generated in S802 is lower than a lower limit of the range indicated by the current detection parameter, the adjusting unit 106 can, for example, perform the following processing. That is, the adjusting unit 106 determines a range of a candidate parameter the lower limit of which is changed from the lower limit value of a range indicated by the current detection parameter to the value of the feature extracted from the selection region corresponding to the frame generated in S802. For example, if the range of the feature of a shoulder angle indicated by the current detection parameter is 40° to 78° and if the feature of a shoulder angle extracted from the selection region corresponding to the frame generated in S802 is 38°, the adjusting unit 106 performs the following processing. That is, the adjusting unit 106 determines a range of 38° to 78° as the range of a candidate parameter relating to the shoulder angle. Alternatively, the adjusting unit 106 can determine a range of a candidate parameter the lower limit of which is changed from the lower limit value of a range indicated by the current detection parameter to a value acquired by subtracting a preset value (such as 1 or 2) from the value of the feature extracted from the selection region corresponding to the frame generated in S802.

In S806, the detecting unit 102 performs processing for detecting an object from an image corresponding to the image file 111 by using the candidate parameter determined in S805 as a detection parameter. The detecting unit 102 transmits information regarding how many objects have been detected as a result of the detection processing to the display unit 105. The display unit 105 displays the pop-up display screen 605, including information indicating the number of detected objects corresponding to the transmitted information, on the display device 208. The pop-up display screen 605 includes, referring to FIG. 6C, the OK button 606 and the CANCEL button 607, used in determining whether a candidate parameter is to be adopted as a detection parameter to be actually used by the detecting unit 102.

In S807, the operation input unit 109 receives selection of the OK button 606 or the CANCEL button 607 based on a user's operation. If the operation input unit 109 receives selection of the OK button 606, the operation input unit 109 determines that the user permits adoption of the candidate parameter as a detection parameter. Then, the processing moves to S808. If the operation input unit 109 receives selection of the CANCEL button 607, the operation input unit 109 determines that the user does not permit adoption of the candidate parameter as a detection parameter. Then, the processing in FIG. 8 ends.

In S808, the adjusting unit 106 updates the information regarding the detection parameter stored in the HDD 204 with the data of the candidate parameter determined in S805 so that the candidate parameter is adopted as a detection parameter that is actually used.

Figure 9:
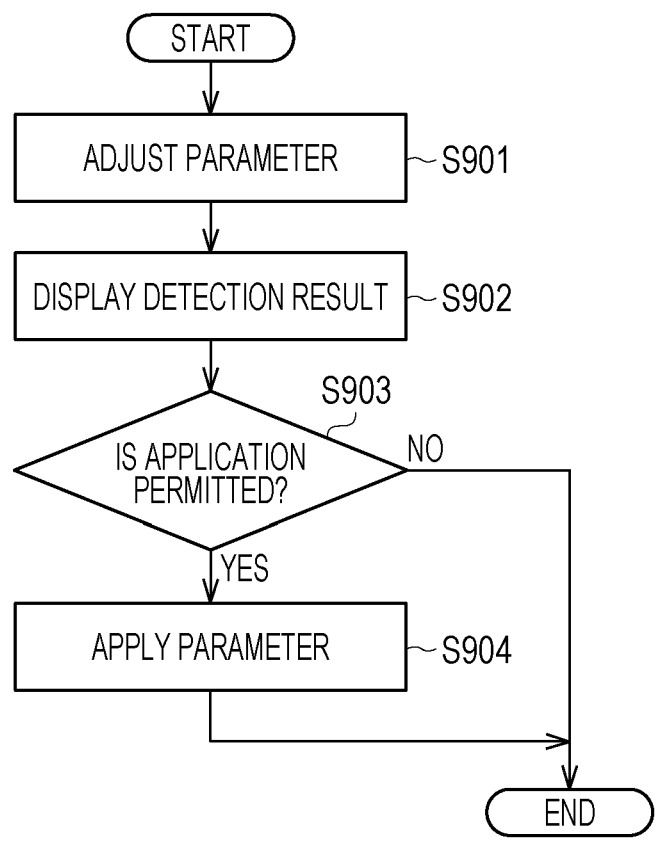
FIG. 9 is a flowchart illustrating another example of processing in the information processing apparatus.

Next, with reference to FIG. 9, the processing in FIGS. 7A to 7D will be described in detail. The processing in FIG. 9 is started when a region that is not to be detected is selected in FIG. 7A and the DELETE button 506 is selected in FIG. 7B.

In S901, the adjusting unit 106 adjusts the detection parameter based on the selection region on the setting screen 500 in FIG. 7A and the current detection parameter, and determines a candidate parameter that is a candidate for a new detection parameter.

If a feature extracted from the selection region selected through the setting screen 500 is included in the range indicated by the current detection parameter, and if it has a value closer to an upper limit value of the range than a lower limit value thereof, the adjusting unit 106 can, for example, perform the following processing. That is, the adjusting unit 106 determines a range of a candidate parameter the upper limit of which is changed from the upper limit value of a range indicated by the current detection parameter to a value (such as value−1 of the extracted feature) lower than the value of the feature extracted from the selection region. For example, if the range of a head size indicated by a current detection parameter is 8 to 25 dots and if the head size extracted from the selection region is 20 dots, the adjusting unit 106 performs the following processing. That is, the adjusting unit 106 determines a range of 8 to 19 dots as the range of a candidate parameter relating to the head size. The adjusting unit 106 can determine a range of a candidate parameter the upper limit of which is changed from the upper limit value of a range indicated by the current detection parameter to a value acquired by subtracting a preset value, such as 2 or 3, greater than or equal to 1 from the value of the feature extracted from the selection region.

If a feature extracted from the selection region that is selected through the setting screen 500 is included in the range indicated by the current detection parameter, and if the feature has a value closer to a lower limit value than an upper limit value of the range, the adjusting unit 106 can, for example, perform the following processing. That is, the adjusting unit 106 determines a range of a candidate parameter the lower limit of which is changed from the lower limit value of a range indicated by the current detection parameter to a value, such as value+1 of the extracted feature, greater than the value of the feature extracted from the selection region. For example, if the range of a head size indicated by a current detection parameter is 8 to 25 dots and if the head size extracted from the selection region is 9 dots, the adjusting unit 106 performs the following processing. That is, the adjusting unit 106 determines a range of 10 to 25 dots as the range of a candidate parameter relating to the head size. The adjusting unit 106 can determine a range of a candidate parameter the lower limit of which is changed from the lower limit value of a range indicated by the current detection parameter to a value acquired by adding a preset value, such as 2 or 3, greater than or equal to 1 to the value of the feature extracted from the selection region.

In S902, the detecting unit 102 performs processing for detecting an object from an image corresponding to the image file 111 by using the candidate parameter determined in S901 as a detection parameter. The detecting unit 102 transmits information regarding how many objects have been detected as a result of the detection processing to the display unit 105. The display unit 105 displays the pop-up display screen 705, including information indicating the number of detected objects corresponding to the transmitted information, on the display device 208. The pop-up display screen 705 includes, referring to FIG. 7C, the OK button 706 and the CANCEL button 707 used in determining whether a candidate parameter is to be adopted as a detection parameter to be actually used by the detecting unit 102.

In S903, the operation input unit 109 receives selection of the OK button 706 or the CANCEL button 707 based on a user's operation. If the operation input unit 109 receives selection of the OK button 706, the operation input unit 109 determines that the user permits adoption of the candidate parameter as a detection parameter. Then, the processing moves to S904. If the operation input unit 109 receives selection of the CANCEL button 707, the operation input unit 109 determines that the user does not permit adoption of the candidate parameter as a detection parameter. Then, the processing in FIG. 9 ends.

In S904, the adjusting unit 106 updates the information regarding the detection parameter stored in the HDD 204 with the data of the candidate parameter determined in S901 so that the candidate parameter is adopted as a detection parameter that is actually used.

Next, with reference to FIG. 10, the processing in S804 will be described in detail. FIG. 10 illustrates processing to be performed when the ADD button 601 is selected in a case where the size of the selection region is insufficient.

A selection region 1001 is a region selected as a region to be detected by a user. When the FINISH SETTING button 505 is selected in this condition, the detecting unit 102 cannot extract features of head size, shoulder angle, and head orientation from the selection region 1001. Accordingly, the adjusting unit 106 can, for example, perform the following processing. That is, the adjusting unit 106 increases the width and height of the selection region 1001 by a preset value, such as 5 dots, about the center of the selection region 1001. Then, the detecting unit 102 again extracts features of head size, shoulder angle, and head orientation from the enlarged selection region 1001. In a case where the detecting unit 102 can extract these features, the adjusting unit 106 determines the size of the enlarged selection region 1001 as a final size of the selection region 1001.

In a case where the detecting unit 102 cannot extract those features, the adjusting unit 106 performs the processing for enlarging the selection region 1001 again. The detecting unit 102 extracts features from the enlarged selection region 1001 again. The adjusting unit 106 enlarges the selection region 1001 until the detecting unit 102 can extract features from the selection region 1001. The size of the selection region 1001 when the detecting unit 102 can extract features is determined as a final size of the selection region. FIG. 10 illustrates a selection region 1003 resulting from a final enlargement of the selection region 1001. The display unit 105 displays the selection region 1003 instead of the selection region 1001.

By performing processing to enlarge the selection region 1001 to an appropriate size, the information processing apparatus 101 can appropriately extract features, even in a case where the size of the selection region 1001 selected by a user is not sufficient for extracting the features.

As described above, according to the present embodiment, the information processing apparatus 101 can adjust a detection parameter based on a selection region that is selected by a user from an image corresponding to the image file 111. Thus, a user can select a region to be detected or not to be detected by performing a simple operation such as a drag operation with a mouse so that the detection parameter can appropriately be adjusted. In other words, the information processing apparatus 101 can provide a technology enabling a user to easily and appropriately adjust the detection parameter.

OTHER EMBODIMENTS

Additional embodiments can be implemented by processing including supplying a program implementing one or more functions according to the aforementioned embodiment to a system or an apparatus over a network or through a storage medium and, by one or more processor in a computer in the system or the apparatus, reading out and executing the program. Embodiments can be implemented by a circuit, such as an ASIC) implementing one or more functions.

The above described embodiments are not seen to be limiting. For example, a part or all of the functional components of the information processing apparatus 101 can be implemented in the information processing apparatus 101.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-140692 filed Jul. 15, 2016, which is hereby incorporated by reference herein in its entirety.

What is claimed is:

1. An information processing apparatus comprising a processor executing a program recorded on a memory device, the executed program performing functions of:
a display unit configured to display an image on a display device;
a detecting unit configured to detect an object in the image based on a first parameter value;
a specifying unit configured to specify a region selected by a user on the displayed image;
an extracting unit configured to extract a feature of the region specified by the specifying unit; and
an updating unit configured to update the first parameter value with a second parameter value to be used by the detecting unit such that the object having the feature extracted by the extracting unit is not to be detected.

2. The information processing apparatus according to claim 1, wherein the updating unit updates the second parameter value such that an object in the region specified by the specifying unit is detected by the detecting unit.

3. The information processing apparatus according to claim 1,
wherein the display unit displays, on the display device, a result of detection performed by the detecting unit by using the second parameter value.

4. The information processing apparatus according to claim 3, wherein the display unit displays a result of detection performed by the detecting unit and displays a screen prompting the user to select whether the second parameter value is to be adopted.

5. The information processing apparatus according to claim 3, wherein the specifying unit specifies the selection region in an image having undergone the object detection processing performed by the detecting unit.

6. The information processing apparatus according to claim 5, wherein the display unit displays a frame of a selection region specified by the specifying unit and a result of the object detection processing so as to be distinguished from each other within the image.

7. The information processing apparatus according to claim 1, the executed program further performs function of:
adjusting unit configured to adjust a size of the region specified by the specifying unit such that the feature of the object in the region is extracted by the extracting unit.

8. The information processing apparatus according to claim 1, wherein the display unit displays, on the display device, the image and a parameter value being used by the detecting unit.

9. The information processing apparatus according to claim 1, wherein the object is a human figure.

10. The information processing apparatus according to claim 1, wherein the second parameter value is a value having a margin to the feature extracted by the extracting unit.

11. A method executed by an information processing apparatus, the method comprising:
displaying an image on a display device;
detecting an object in the image based on a first parameter value;
specifying a region selected by a user in-on the displayed image;
extracting a feature of the region specified; and
updating the first parameter value with a second parameter value to be used such that the object having the feature extracted is not to be detected.

12. The method according to claim 11, wherein the second parameter value is updated such that an object in the region specified is detected.

13. The method according to claim 11, further comprising:
displaying, on the display device, a result of detection by using the second parameter value.

14. The method according to claim 13, wherein a result of detection is displayed and displaying a screen prompting the user to select whether the second parameter value is to be adopted.

15. A non-transitory computer-readable storage medium storing computer executable instructions for causing a computer to execute a method, the method comprising:
- displaying an image on a display device;
- detecting an object in the image based on a first parameter value;
- specifying a region selected by a user on the displayed image;
- extracting a feature of the region specified; and
- updating the first parameter value with a second parameter value to be used such that the object having the feature extracted is not to be detected.

\* \* \* \* \*